(12) United States Patent
Withers et al.

(10) Patent No.: US 7,626,635 B2
(45) Date of Patent: Dec. 1, 2009

(54) METHOD AND SYSTEM OF DETECTING SIGNAL PRESENCE FROM A VIDEO SIGNAL PRESENTED ON A DIGITAL DISPLAY DEVICE

(75) Inventors: James G. Withers, Chesterfield, MO (US); Yousri H. Barsoum, St. Louis, MO (US); Edward J. Koplar, St. Louis, MO (US); Michael C. Reynolds, Ballwin, MO (US)

(73) Assignee: Koplar Interactive Systems International, L.L.C., St. Louis, MO (US)

( * ) Notice: Subject to any disclaimer, the term of this patent is extended or adjusted under 35 U.S.C. 154(b) by 733 days.

(21) Appl. No.: 10/817,109

(22) Filed: Apr. 2, 2004

(65) Prior Publication Data

US 2004/0227854 A1 Nov. 18, 2004

Related U.S. Application Data

(60) Provisional application No. 60/460,584, filed on Apr. 4, 2003.

(51) Int. Cl.
*H04N 7/08* (2006.01)
(52) U.S. Cl. .................. 348/473; 348/461; 348/553
(58) Field of Classification Search .......... 348/473, 348/476, 478, 458, 469, 564, 553, 581, 548, 348/461
See application file for complete search history.

(56) References Cited

U.S. PATENT DOCUMENTS 4,807,031 A 2/1989 Broughton et al.
5,305,104 A * 4/1994 Jensen et al. ............. 348/473

(Continued)

OTHER PUBLICATIONS

Australian Patent Application No. 2004226927, Examiner's First Report dated Feb. 13, 2009 (2 pages).

*Primary Examiner*—Trang U Tran
(74) *Attorney, Agent, or Firm*—Polsinelli Shughart PC

(57) ABSTRACT

A system for transmitting a modulated video signal to be presented on a digital display device, the video signal having a first frame and a second frame, the first frame and the second frame each comprised of a plurality of pixels, the system comprising a signal source for generating a video signal, an encoder, the encoder comprising a means for receiving the video signal from the signal source, a means for selectively altering luminance of the pixels of the first frame and the second frame of the video signal to represent a signal presence or signal absence and thereby creating a modulated video signal, and a means for providing the modulated video signal to a broadcast source, and the broadcast source for providing the modulated video signal from the encoder to a digital display device.

11 Claims, 13 Drawing Sheets

U.S. PATENT DOCUMENTS

| | | | |
|---|---|---|---|
| 5,594,493 A | | 1/1997 | Nemirofsky |
| 5,644,363 A | * | 7/1997 | Mead .......................... 348/563 |
| 5,767,896 A | | 6/1998 | Nemirofsky |
| 5,880,769 A | | 3/1999 | Nemirofsky et al. |
| 5,907,350 A | | 5/1999 | Nemirofsky |
| 5,953,047 A | | 9/1999 | Nemirofsky |
| 6,094,228 A | | 7/2000 | Ciardullo et al. |
| 6,215,526 B1 | * | 4/2001 | Barton et al. ................ 348/473 |
| 6,229,572 B1 | | 5/2001 | Ciardullo et al. |
| 6,370,275 B1 | | 4/2002 | Benoit et al. |
| 6,404,440 B1 | | 6/2002 | Doyen et al. |
| 6,449,379 B1 | | 9/2002 | Rhoads |
| 6,661,905 B1 | | 12/2003 | Chupp et al. |
| 7,167,209 B2 | * | 1/2007 | Cookson et al. ............. 348/473 |
| 2002/0112250 A1 | | 8/2002 | Koplar et al. |
| 2002/0183102 A1 | | 12/2002 | Withers et al. |
| 2004/0262395 A1 | | 12/2004 | Longacre, Jr. |
| 2004/0262399 A1 | | 12/2004 | Longacre, Jr. |
| 2005/0094031 A1 | | 5/2005 | Tecot |
| 2005/0264694 A1 | * | 12/2005 | Ilan et al. .................... 348/473 |
| 2006/0080556 A1 | | 4/2006 | Rhoads |
| 2006/0175413 A1 | | 8/2006 | Longacre, Jr. |
| 2006/0188128 A1 | | 8/2006 | Rhoads |
| 2006/0200260 A1 | | 9/2006 | Hoffberg |
| 2007/0071322 A1 | | 3/2007 | Maltagliati et al. |

* cited by examiner

MESSAGE DECODING METHOD

METHOD AND SYSTEM OF DETECTING SIGNAL PRESENCE FROM A VIDEO SIGNAL PRESENTED ON A DIGITAL DISPLAY DEVICE

CROSS-REFERENCE TO RELATED APPLICATIONS

This application is based upon U.S. Provisional Patent Application titled "Method and System of Transmitting Auxiliary Data from a Digital Display Device", Ser. No.: 60/460,584, Filed 4 Apr. 2003 by James G. Withers, Yousri H. Barsoum, Edward J. Koplar and Michael C. Reynolds, which is herein incorporated by reference and continued preservation of which is requested.

BACKGROUND OF THE INVENTION

The present invention relates to a method of encoding a carrier signal within a video signal presented by a digital display device, and more particularly to a method for modulating carrier signals in a video signal, presenting the video signals on a digital display device, receiving the video signals on a detector or a combo user device, detecting the carrier signal in the video signal, and providing the detector or combo user device with a notification of a signal presence or a signal absence of the carrier signal in the video signal.

Users of these hand-held devices selectively receive notification of the signal absence or signal presence of carrier signals for purposes including enjoyment, promotion, transfer of information, data collection, commercial verification, security, education, and transactions or verifications at points of sale, as well as other commercial, personal, entertainment, or amusement purposes collectively referred to herein as "promotional opportunities".

Various methods exist in the art for transmitting a carrier (or subcarrier) signal along with video signals, wherein the carrier signal is used for a variety of signaling purposes. Several of these methods transmit the carrier signals, such as in the form of auxiliary data, in the video signals by replacing active portions of the video signal with auxiliary data, such that users who view the video signal on their display devices (e.g., televisions) will see the effect of the carrier signal in the form of an icon, dot or other visual image or disturbance in the picture. Other methods transmit carrier signals in non-viewable scan lines of the video signal, such as in the vertical blanking interval (VBI). However, these scan lines may already contain other carrier signals such as signals that represent cueing information, timing information or closed captioning information and are prone to being stripped by programming operators prior to broadcast.

Another method for transmitting a carrier signal in video signals is described in U.S. Pat. No. 4,807,031 to Broughton et al. ("Broughton") entitled "Interactive Video Method and Apparatus", which relates generally to in-band video broadcasting of commands and other encoded information to interactive devices and is incorporated by reference herein. The invention described therein relates generally to interactive educational and entertainment systems, and is described in one embodiment in the context of television program control of toys located where there is a television receiver, as within a residence.

To encode control data, Broughton discloses a novel method of luminance or chrominance modulation of a video signal that creates a composite video signal, wherein the video signal is modulated with control data. The novel modulation method alternately raises and lowers the luminance/chrominance of paired adjacent horizontal scan lines to create a video subcarrier that contains the control data.

In Broughton, the video signal is not being replaced with other data, nor is the data being added as a separate signal along with the video signal. Rather, the video signal itself is modulated to carry the control data. Therefore, the control data is a part of, or contained within, the video signal and yet is imperceptible to the human eye. The encoding method also includes preview and remove circuitry to ensure suitability or the signal presence of data encoding and removal of data encoding, respectively.

The control data is transmitted either by television broadcast means, or by pre-recorded video players that are connected to a video display. The control data is then received by the video display where at least one video field of the video display is modulated by control data. The control data is then detected with either opto-electronic or radio frequency (RF) detection means that discriminate between the program material and the control data to detect the control data. The detected control data is further reproduced so that the control data can be used with an interactive device.

Improvements on the method of modulation described in Broughton are described in U.S. Pat. No. 6,094,228 to Ciardullo et al. and U.S. Pat. No. 6,229,572 to Ciardullo et al. (referred to collectively herein as "Ciardullo"). Both Ciardullo patents describe improved methods of modulation wherein the auxiliary data is inserted on the visual portion of a video signal by changing the luminance of paired scan lines in opposite directions. Instead of raising and lowering the intensity on the whole line as in Broughton, Ciardullo uses pseudo noise sequences to raise and lower the intensity on portions of a first line, where the line paired to the first line is modulated with the inverse pseudo noise sequences. Ciardullo thereby allows larger amounts of auxiliary data to be modulated in the video signal by use of the pseudo noise sequences. Broughton and Ciardullo, which are owned by the assignee of the present invention, are incorporated by reference herein.

Prior efforts by the assignee of the present patent application also include U.S. Utility patent application entitled "Interactive Optical Cards and Other Hand-Held Devices with Increased Connectivity", Ser. No. 09/489,373, filed Jan. 21, 2000 by Edward J. Koplar and Daniel A. Ciardullo (referred to hereinafter as "Koplar I"), which is incorporated by reference herein. Koplar I relates to various hand-held device embodiments and methods of use by receiving auxiliary data (i.e., control data) from a signal source and providing the user of the hand-held device with various promotional opportunities, such as interactive advertising and gaming, as a result of receiving the auxiliary data.

Another patent application by the assignees of the present invention is U.S. Utility patent application entitled "Universal Methods and Device for Hand-Held Promotional Opportunities", Ser. No. 09/829,223, filed Apr. 9, 2001 by Edward J. Koplar, Daniel A. Ciardullo, James G. Withers and Christopher E. Chupp (referred to hereinafter as "Koplar II"), which is incorporated by reference herein. Koplar II describes additional methods of providing auxiliary data to hand-held devices for the purpose of providing a user of the hand-held device with promotional opportunities, as well as apparatuses for use with same.

Yet another patent application by the assignees of the present invention is U.S. Utility patent application entitled "RBDS Method and Device for Processing Promotional Opportunities", Ser. No. 10/126770, filed on Apr. 19, 2002 by James G. Withers and Alan G. Maltagliati (referred to hereinafter as "Withers"), which is incorporated by reference herein. Withers describes further improvements to Koplar I and Koplar II including the transmission of auxiliary data to a hand-held device by use of the RBDS system.

Still another patent application by the assignees of the present invention is U.S. Utility patent application entitled "Method and Apparatus for Modulating a Video Signal With Data", Ser. No. 10/676,940, filed on Oct. 1, 2003 by Yousri Barsoum, Alan G. Maltagliati, Daniel A. Ciardullo and Christopher E. Chupp (the application being herein termed "Barsoum"), which is incorporated by reference herein. Barsoum describes the use of a memory card coupled to a slotted hand-held device for receiving video signals by use of the memory card, transmitting the signals from the card to the slotted hand-held device, decoding auxiliary data from the video signals on the slotted hand-held device and providing the user of the slotted hand-held device with a benefit from the reception of the auxiliary data. Barsoum also describes a method of improving the reliability and speed of the transmission and reception of auxiliary data by storing data in video frames split into multiple fields and encoding complementary data bits in each field.

The Broughton method of encoding auxiliary data in a video signal and its improvements were generally intended for use with analog display devices. The Broughton method of encoding auxiliary data in the active portion of analog video signals relies on NTSC's interlaced scanning process during video signal transmission. At the display device (e.g., signal source), a video signal is split into two sequentially transmitted images referred to as fields. The display device scans 262.5 of the horizontal lines left to right and from top to bottom by skipping every other line, thus completing the scan of a first field, and then retracing to the top of the image and scanning the remaining 262.5 lines, for a second field. Both fields are reassembled by interlacing them at the display device to construct one complete frame. Each field (i.e., half-frame) screen scan takes approximately 1/60 of a second; a complete frame is scanned every 1/30 second.

An analog display device operates by use of a very fine pitch electron beam which strikes phosphors coating on an internal face of the cathode ray tube (CRT). The phosphors emit light of intensity which is a function of the intensity of the beam striking it. A period of 1/60 second is required for the electron beam to completely scan down the CRT face to display a field of the image. During the following 1/60 second, the interlaced field is scanned, and a complete frame of video is then visible on the analog display device. The phosphors coating on the face of the tube is chemically treated to retain its light emitting properties for a short duration. Thus, the first area of the scanned picture begins to fade just as the electron beam retraces (i.e., during the vertical retrace) to the top of the screen to refresh it. Since the electron beam covers 525 lines 30 times per second, a total of 15,750 lines per second is viewed each second. Analog video signal transmissions employ a variable wave form; digital transmissions comprise pulse-form which signals transmission varies between different levels such as on and off to represent digital ones and zeroes.

Digital display devices operate in a different manner than analog display devices, as they do not have CRTs or any type of electron beam. Whereas the phosphors-coated face of a CRT in an analog display device is passive (i.e., it merely emits light in direct correlation to the intensity of the electron beam that strikes it), a plasma or LCD digital display device is comprised of pixels (i.e., active picture elements). The pixels may be small semiconducting devices that can be turned on and off at will, one at a time, or simultaneously, in place of the CRT. LCD, digital light projector (DLP), flat-panel, plasma and other digital display devices are collectively referred to herein as "digital display devices".

The digital television standards in the U.S. allow several different broadcast formats, including:
  480i—The picture is 704×480 pixels, sent at 60 interlaced frames per second (30 complete frames per second);
  480p—The picture is 704×480 pixels, sent at 60 complete frames per second;
  720p—The picture is 1280×720 pixels, sent at 60 complete frames per second;
  1080i—The picture is 1920×1080 pixels, sent at 60 interlaced frames per second (30 complete frames per second); and
  1080p—The picture is 1920×1080 pixels, sent at 60 complete frames per second.

(The "p" and "i" designations stand for "progressive" and "interlaced." In a progressive format, the full picture updates every sixtieth of a second. In an interlaced format, half of the picture updates every sixtieth of a second.)

Digital display devices store each frame of a video signal and each frame is displayed as a whole picture on the digital display device. Thirty frames (i.e., pictures) are transmitted per second, or thirty pictures are transmitted and sixty are displayed as each picture is displayed twice. Thus, the resulting frame frequency is either 30 Hertz or 60 Hertz. The present invention makes use of this frequency, which is the refresh rate of the display at 60 frames per second.

In CRT operation, each scan line occupies a constant amount of time to display on the CRT. The time to scan each line is 63.5 microseconds, so that 15,750 lines are scanned each second, i.e., with a frequency of 15,750 Hertz. Using an optical detection device such as a photodiode, this frequency can be detected as described in Broughton. Broughton subtly changes the amplitude of alternate lines of video which also may be detect by the photodiode at a half scan line rate of 7875 Hertz (roughly 8000 Hertz) signal. In operating a typical digital display device, neither of these frequencies exist since the entire picture may be displayed at once rather than line by line. However, the frame display rate of 30 Hertz is constant both in analog (e.g., CRT) and digital displays (e.g., flat panel).

For purposes of the present invention, the term "hand-held device" means an interactive device of portable character, preferably of hand-held type that may be carried in the palm by a user, or between fingers of the user, or is otherwise intended to be easily grasped and handled manually by the user. Smart cards, mobile phones, personal digital assistants (PDA's), games devices and similar hand-held devices with or without capability for memory cards that are capable of participating with the promotional opportunities described in the present invention and are collectively referred to herein as "hand-held devices" of the present invention.

The term "computer" is also used herein in its broadest possible sense, and may include without limitation a laptop, compact or personal computer, mobile phone, gaming device, personal digital assistant (PDA), or other computer-like device.

SUMMARY OF THE INVENTION

The present invention discloses a novel method of encoding carrier signals in video signals to be presented on a digital display device and a detector for receiving the video signal and detecting the carrier signal, and more particularly to a method of modulating a video signal with a carrier signal, presenting the modulated video signal on a digital display device, receiving the modulated video signal on a detector, detecting the carrier signal from the modulated video signals, and providing a benefit from the detection of the carrier signal.

A video program in the form of video signal is transmitted from a signal source to an encoder. An operator interacts with the encoder to control its operation. A carrier signal is selectively encoded in the video signal by the encoder over one or more sets of two frames of the video signal for a time interval by the operator for signaling purposes, such as to signal signal presences and signal absences over desired intervals in the video signal.

Upon modulating the video signal, the encoder outputs a modulated video signal comprised of the video signal and the carrier signal. The modulated video signal is then provided to a broadcast source for dissemination or distribution to one or more end-users who view the video program. The broadcast source provides the modulated video signal to a decoder, which passes the modulated video signal through to the digital display device unaltered.

The decoder uses the modulated video signal to determine whether a carrier signal is present in the modulated video signal over a specified or predetermined time interval so as to trigger a signal absence (e.g., carrier signal not present) or signal presences (e.g., carrier signal present) of the carrier signal. When the carrier signal is present, the decoder provides notification of the signal presence of the carrier signal to a signaled device by transmission of the transmission signal. When the carrier signal is not to present, the decoder transmits a signal absence. Preferably, the signaled device and the decoder are combined together in a combo user device such as a hand-held device that considers the signal presence to be a data bit of "1" and the signal absence a data bit of "0" and uses the data bits to provide promotional opportunities to its user.

The preferred encoding method of the present invention is by generating the video signal in real time or pre-recorded at the signal source. Thereafter, the video signal is provided to the encoder from the signal source. The encoder then stores the chrominance value of the digitized video signal in storage. The operator then directs the encoder through various indications received by the encoder through the carrier signal presence on the inclusion of signal presences and signal absences in selected pairs of frames of the video signal. Upon receipt of the indications from the operator, the encoder first determines the timing of where the fields of the frames of the video signal start by use of the vertical synchronization signal. The encoder thereafter determines whether to encode a signal absence or signal presence based on the indication received through the carrier signal presence. If the encoder does not receive any instructions via the carrier signal presence to modify the video signal, the encoder encodes signal absences. However, when the encoder seeks to encode a signal presence, the encoder modifies the luminance of two frames of the video signal so as to modulate the video signal.

The preferred encoding method of the present invention is by generating the video signal in real time or pre-recorded at the signal source. Thereafter, the video signal is provided to the encoder from the signal source. The encoder then stores the chrominance value of the digitized video signal in storage. The Operator then directs the encoder through various indications received by the encoder through the carrier signal presence on the inclusion of signal presences and signal absences in selected pairs of frames of the video signal. Upon receipt of the indications from the operator, the encoder first determines the timing of where the fields of the frames of the video signal start by use of the vertical synchronization signal. The Encoder thereafter determines whether to encode a signal absence or signal presence based on the indication received through the carrier signal presence. If the encoder does not receive any instructions via the carrier signal presence to modify the video signal, the encoder encodes signal absences. However, when the encoder seeks to encode a signal presence, the encoder modifies the luminance of two frames of the video signal so as to modulate the video signal.

In an alternate embodiment, the encoder modulates a constant 15 Hertz signal within every frame of the video signal or an encoded portion thereof. The encoder encodes a signal presence by slightly increasing the amplitude of the 15 Hertz signal within a frame, and encodes a signal absence by slightly decreasing the amplitude of the 15 Hertz signal within a frame.

In a further embodiment, the encoder encodes one or more bits of auxiliary data per two consecutive frames by adjusting the amplitude to predetermined levels representing one or more bits. During decode, the amplitude is measured based on predetermined levels and relates to one or more bits.

To detect carrier signals by use of the present invention, in the preferred embodiment a detector in hand-held form is outfitted with a photodetector used to visually detect overall light energy emanating from the digital display device. A hand-held device typically is outfitted with a photodetector, microcontroller, memory and other circuitry to receive and process the modulated video signal. The microcontroller and circuitry of the hand-held device filter all frequencies over 60 Hertz. Thereafter, the remaining signal present is a low frequency amplitude modulated signal.

When encoding carrier signals as auxiliary data, a ones-complement scheme (matching a stream of alternating ones and zeros against each other) is preferably used to detect packet start and CRC checking is used for error correction. The final result is a 15 bit/sec data stream (depending upon the embodiment and intensity chosen) that can be detected by a hand-held device with an optical detector similar in some respects to those described in Koplar I and Koplar II.

In making use of the present invention, signals are received, detected, and reproduced by the hand-held devices for various promotional opportunities including: enjoyment; promotion; coupon or prize validation; advertising by sponsors; advertising verification and polling; transfer of information; data collection; commercial verification; security and access; education; game playing; transactions, verifications, or redemption by sponsoring entities or related commercial locations at points of sale including the Internet; other commercial and non-commercial purposes.

The following are merely illustrative of some of the uses, advantages and objects which the new system provides: television advertising response determination; interactive advertising and promotions; attracting of viewers attention; effectively increasing consumer awareness and retention of commercial advertising, messages, announcements, promotions, and specific products and services; increasing customer differentiation of products and services; stimulating viewers to watch commercials; increasing store traffic in response to commercial messages; fostering consumer loyalty; enhancing viewer involvement in program content, including commercials; enhancement of viewer retention of the content of commercial and other messages; enhancing value of commercial messages; increased product/service sales; saving advertising costs; acceleration of response time of customers following delivery of commercial messages; verifying contests and awards; enhancing viewer retention of the related website domain names; reducing of barriers related to e-commerce opportunities; providing additional and sometimes instant rewards and information obtainable via the Internet.

When carrier signals are detected by use of the decoder, various signals, indications, display readouts, or other interactive events provide the user with a benefit. The various interactive events described in Koplar I, Koplar II, Withers and Barsoum are usable interchangeably by and in conjunction with the hand-held device and methods of use with the present invention. The interchangeability includes selective use of the features of the present invention, along with selective use of any of the various apparatus and methods of Koplar I, Koplar II, Withers and Barsoum.

The uses, objects and advantages of the invention are more fully developed in the following description.

BRIEF DESCRIPTION OF THE DRAWINGS

Corresponding reference characters indicate corresponding elements among the several views.

DETAILED DESCRIPTION OF THE INVENTION

Figure 1:
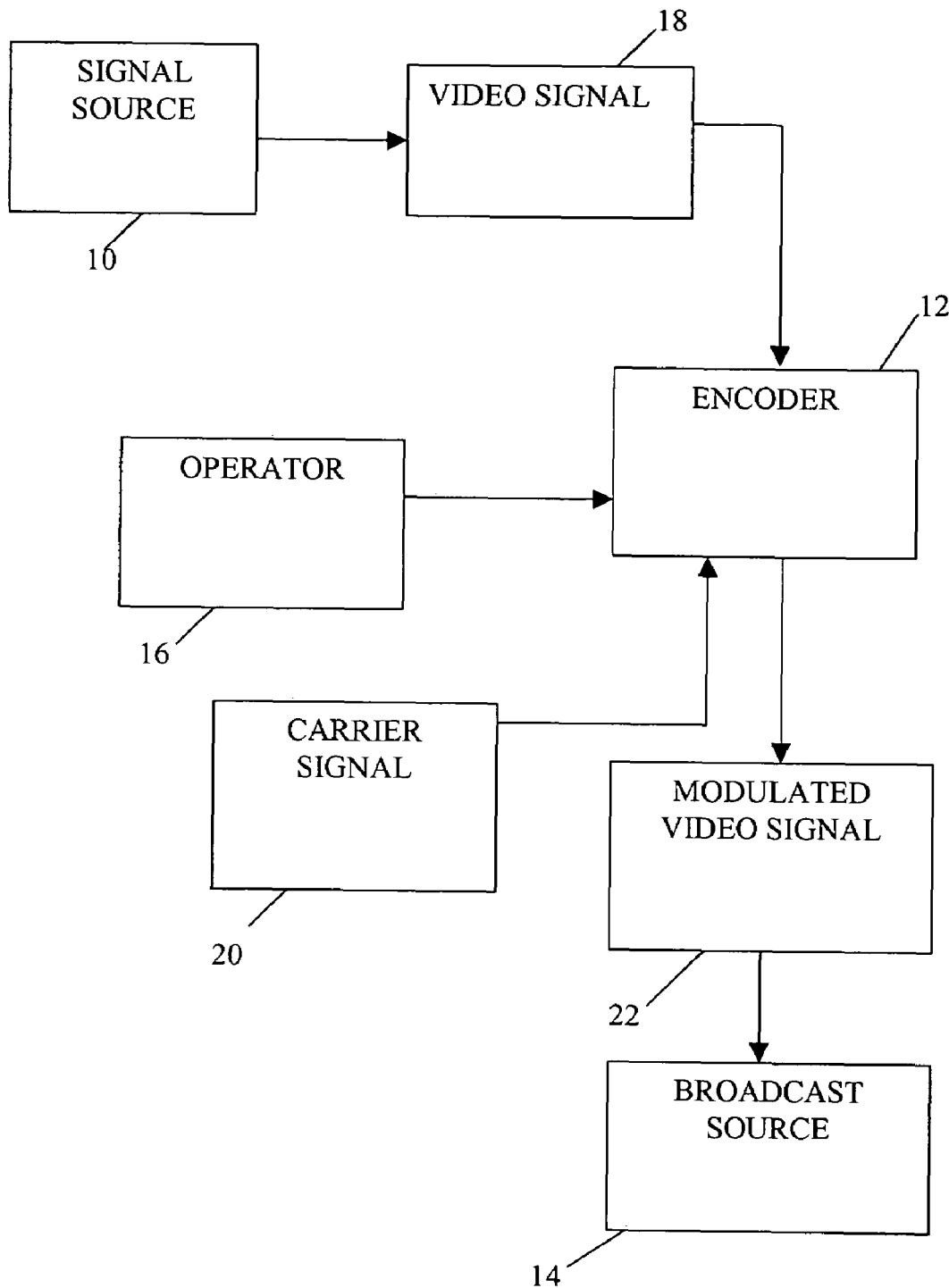
FIG. 1 is a first flow chart of the encoding method of the present invention.

Referring to the drawings, the preferred embodiment of a method of encoding a carrier signal within a video signal presented by a digital display device is illustrated in FIGS. 1-13.

Referring to FIG. 1, a video program in the form of video signal 18 is transmitted from a signal source 10 to an encoder 12. Video signal 18 is preferably a digital video signal, but may be other video signals or video signal formats compatible with the present invention. Video signal 18 may either be in analog or digital form, as encoder 12 handles either signal via analog signal input 32 and digital signal input 30 as described in greater detail below. The preferred format for a digital video signal under the present invention is the serial digital interface (SDI), the technical standard of which is maintained by the Society of Motion Picture and Television Engineers (SMPTE) as SMPTE 259M. SDI at the time of the invention is the standardized protocol for sending video information in a digital bit stream.

Signal source 10 is typically a high definition digital video source such as a high definition television broadcast station, but may also be other sources of video signals including a professional grade video tape player with a video tape containing a video program, camcorder or a digital versatile disc (DVD) player with a DVD video containing a video program. Encoder 12 is described in further detail in the description of FIG. 3 below.

Operator 16 interacts with encoder 12 to control operation of encoder 12. Preferably, operator 16 is a person that interacts with encoder 12 through the use of a computer or other electronic control device as will be described in greater detail below. However, operator 16 may consist entirely of a computer or other electronic control device that directs operation of encoder 12 in an automated manner.

A carrier signal 20 is selectively encoded in video signal 18 by encoder 12 over one or more sets of two frames of video signal 18 for a time interval by operator 16 for signaling purposes, such as to embed signal presences and signal absences in video signal 18 over desired intervals. Upon modulating video signal 18, encoder 12 outputs a modulated video signal 22 comprised of video signal 18 and carrier signal 20.

Modulated video signal 22 is then provided to a broadcast source 14 for dissemination or distribution to one or more end-users who view the video program. Broadcast source 14 is preferably a high definition television broadcast source, but also may be other media sources including video tapes, DVD media or other digital storage media that will be provided to one or more end users, television broadcast stations, cable or satellite sources or wireless sources that broadcast programs.

Figure 2:
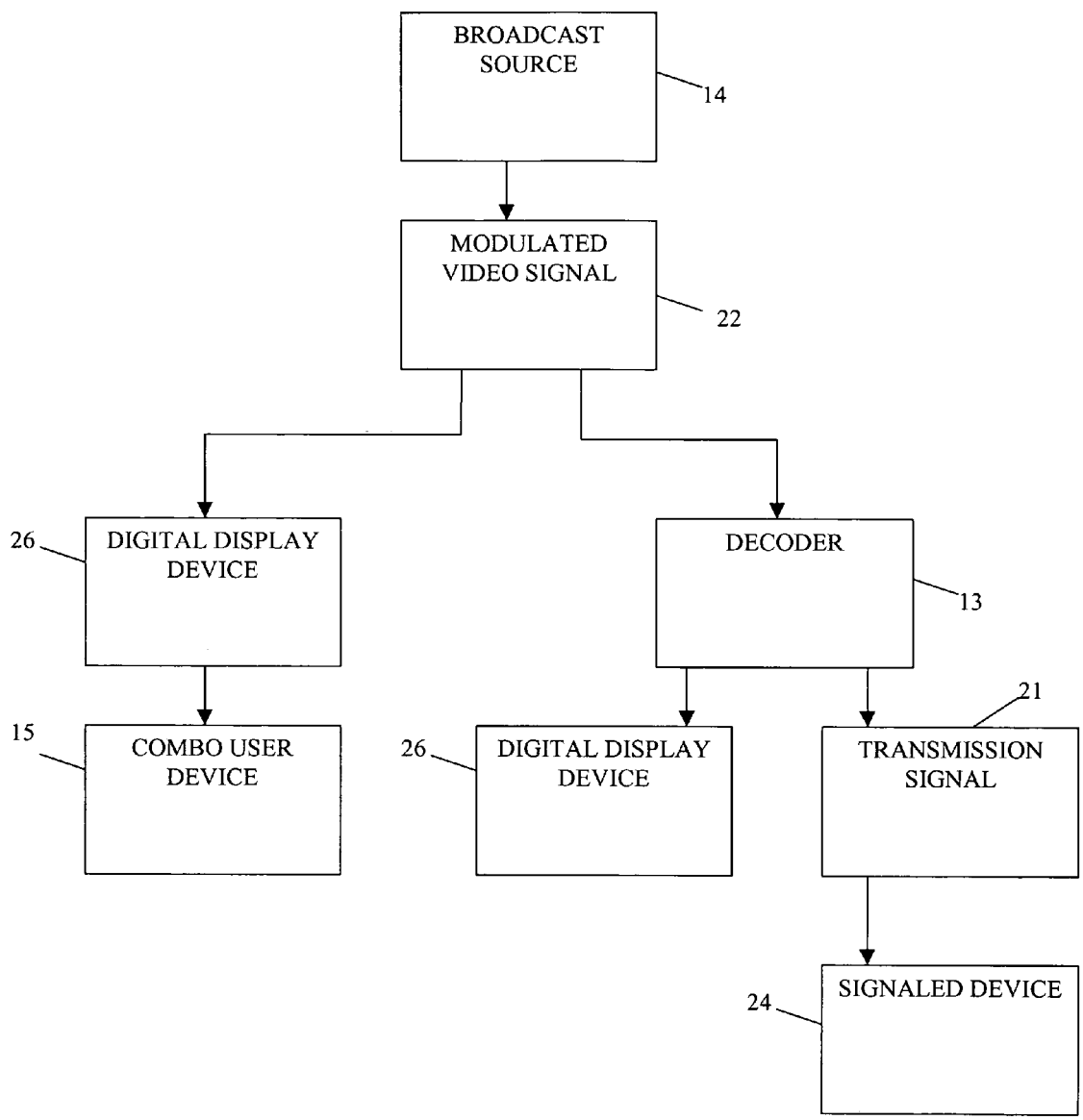
FIG. 2 is first a flow chart of the decoding method of the present invention.

Referring to FIG. 2, broadcast source 14 provides modulated video signal 22 to a decoder 13, which passes modulated video signal 22 through to digital display device 26 unaltered. Digital display device 26 differs from a standard analog display device in that digital display device 26 is an active display such that each of its pixels illuminate at the same time, instead of when they are struck by an electron beam from a CRT tube. Additionally, the pixels of digital display device 26 are instant on/instant off and do not retain any trace of video signal 18. In contrast, analog display devices have a p-factor of 4 in retaining video signal 18. It should also be understood that digital display device 26 may alternatively be a digital video recorder and other devices capable of digitally presenting or recording video signals.

As discussed in greater detail below, decoder 13 uses modulated video signal 22 to determine whether a carrier signal 20 is present in modulated video signal 22 over a specified or predetermined time interval so as to trigger a signal absence (e.g., carrier signal 20 not present in video signal 18) or signal presences (e.g., carrier signal 20 present in video signal 18) of carrier signal 20. Decoder 13 is suitably configured and connected to broadcast source 14 to receive modulated video signal 22 and detect carrier signal 20 therefrom. When carrier signal 20 is present, decoder 13 provides notification of the signal presence of carrier signal 20 to a signaled device 24 by transmission of transmission signal 21. When carrier signal 20 is not to present, decoder 13 transmits a signal absence. Signaled device 24 is preferably any device that is capable of receiving and utilizing one or more signal absences and signal presences. Preferably, transmission signal 21 is a wireless radio frequency signal, but it should be understood that other types of signals including infrared are felt to fall within the scope of the present invention.

Preferably, signaled device 24 and decoder 13 are combined together in a combo user device 15 such as a hand-held device that considers the signal presence to be a data bit of "1" and the signal absence a data bit of "0" and uses the data bits to provide promotional opportunities to its user. Combo user device 15 does not send or receive transmission signal 21, bu rather receives video signal 18 optically directly from digital display device 26 and is described in greater detail below.

Figure 3:
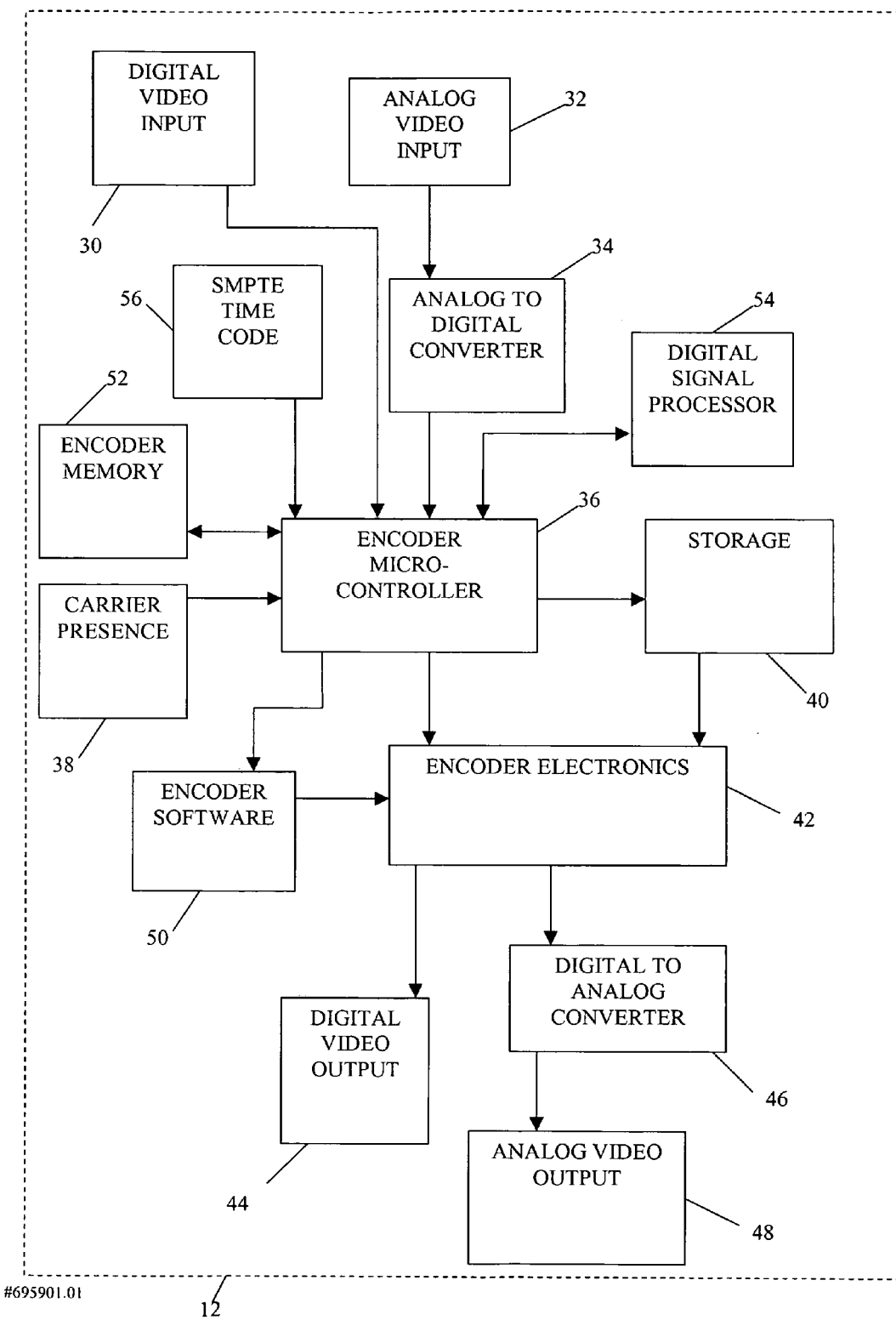
FIG. 3 is a block diagram of the encoder of the present invention.

Referring to FIG. 3, encoder 12 is shown in greater detail to first include encoder micro-controller 36, which may consist of more than one processor to manage the various processing and input/output of the present invention, and preferably consists of a second processor in the form of a digital signal processor 54. Digital signal processor 54 assists encoder microcontroller 36 with processing signal and other information of encoder 12, including modulating carrier signal 20 in video signal 18. It should be appreciated that encoder 12 may comprise varying degrees of hardware and software, as various components may interchangeably be used as either. Moreover, the specific electronics and software used by encoder 12 may differ when its technology is included in a pre-existing device as opposed to a stand-alone device.

Encoder 12 further comprises a digital video input 30 that is electronically coupled to encoder micro-controller 36 and capable of receiving video signal 18 from signal source 10 and passing it to encoder micro-controller 36. However, encoder 12 may receive an analog video signal 18 via analog video input 32 and analog to digital converter 34. Analog to digital converter 34 digitizes the analog video signal 18 according to known techniques such that it may be digitally provided to encoder micro-controller 36.

Encoder micro-controller 36 is electronically connected to a carrier presence 38, which provides encoder micro-controller 36 with the timing of where, when and at what intensity encoder 12 should selectively alter the intensity of the pixels of a frame of video signal 18 or portions thereof at the direction of operator 16. Preferably, such instructions are received by carrier presence 38 via a serial port. However it should appreciated in the art of computer hardware that other device interconnects of encoder 12 are contemplated for carrier presence 38 including via universal serial bus (USB), "Firewire" protocol (IEEE 1394), and various wireless protocols. In an alternate embodiment, carrier presence 38 may be an operator interface so that operator 16 can directly interface with encoder 12.

When encoder micro-controller 36 receives video signal 18 and instructions from carrier presence 38, encoder microcontroller 36 directs encoder software 50 to store the chrominance information (and/or luminance information as desired) of video signal 18 in storage 40 from which it split off by use of a comb filter of encoder electronics 42. Encoder electronics 42 at the direction of encoder micro-controller 36 selectively uses the present invention and (optionally in conjunction the methods of Broughton and/or its improvements as desired) to increase and decrease the intensity of the pixels of the frames of video signal 18 thereby creating modulated video signal 22. The luminance of video signal 18 is then reassembled with the chrominance to provide a complete modulated video signal 22. The resulting modulated video signal 22 is then sent digitally from encoder 12 by digital video output 44, or in analog form by converting the resulting digital signal with digital to analog converter 46 and outputting modulated video signal 22 by analog video output 48.

Preferably, an SMPTE time code 56 is present on encoder 12 and electronically coupled to encoder microcontroller 36. SMPTE time code 56 enables encoder 12 to encode carrier signal 20 at predetermined portions of video signal 18 by use of a similar SMPTE code on the source of carrier presence 38, instead of a person such as operator 16 manually directing the encoding of carrier signal 20.

Figure 4:
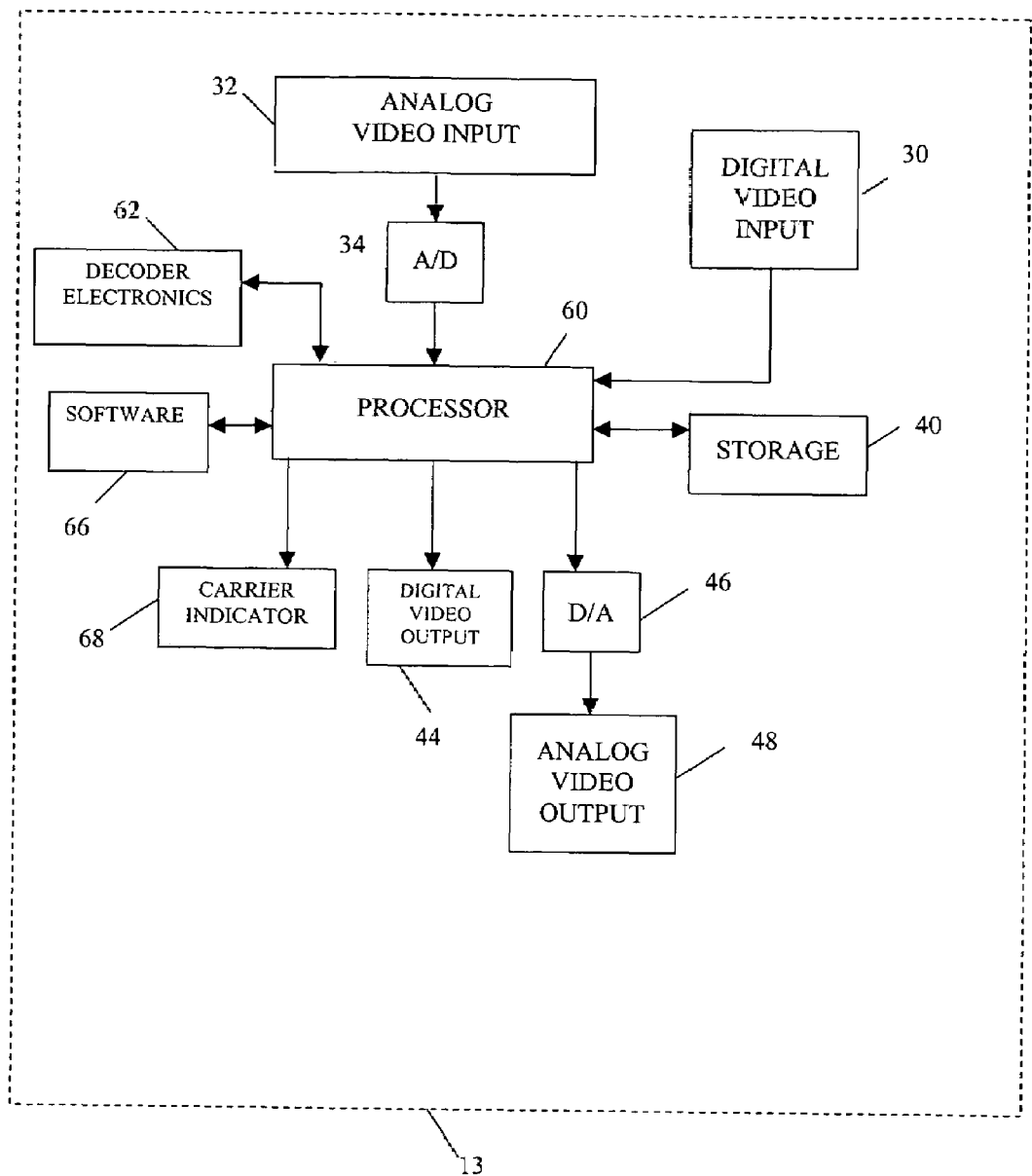
FIG. 4 is a block diagram of a decoder of the present invention.

Referring to FIG. 4, decoder 13 receives modulated video signal 22 from broadcast source 14 by analog video input 32 when modulated video signal 22 is analog, and by digital video input 30 when modulated video signal 22 is digital. Digital video input 30 directly passes modulated video signal 22 to decoder processor 60, while analog video input 32 rectifies and digitizes modulated video signal 22 by use of analog to digital converter 34 before passing modulated video signal 22 to decoder processor 60.

Preferably, decoder processor 60 stores the luminance of modulated video signal 22 in memory (not shown) or storage 40 while decoder electronics 62 detects frames of modulated video signal 22 that have increased or decreased intensity. The preferred embodiment of the detection scheme used with decoder 13 is described below.

Transmission signal 21 is outputted from decoder 13 by carrier indicator 68 so as to notify signaled device 24 of the detection of signal absences or signal presences. Decoder 13 also outputs modulated video signal 22 in digital format via digital video output 44, or modulated video signal 22 in analog format by first converting signal 22 from the digital to analog format by use of digital to analog converter 46, and then outputting signal 22 via analog video output 48.

Figure 5:
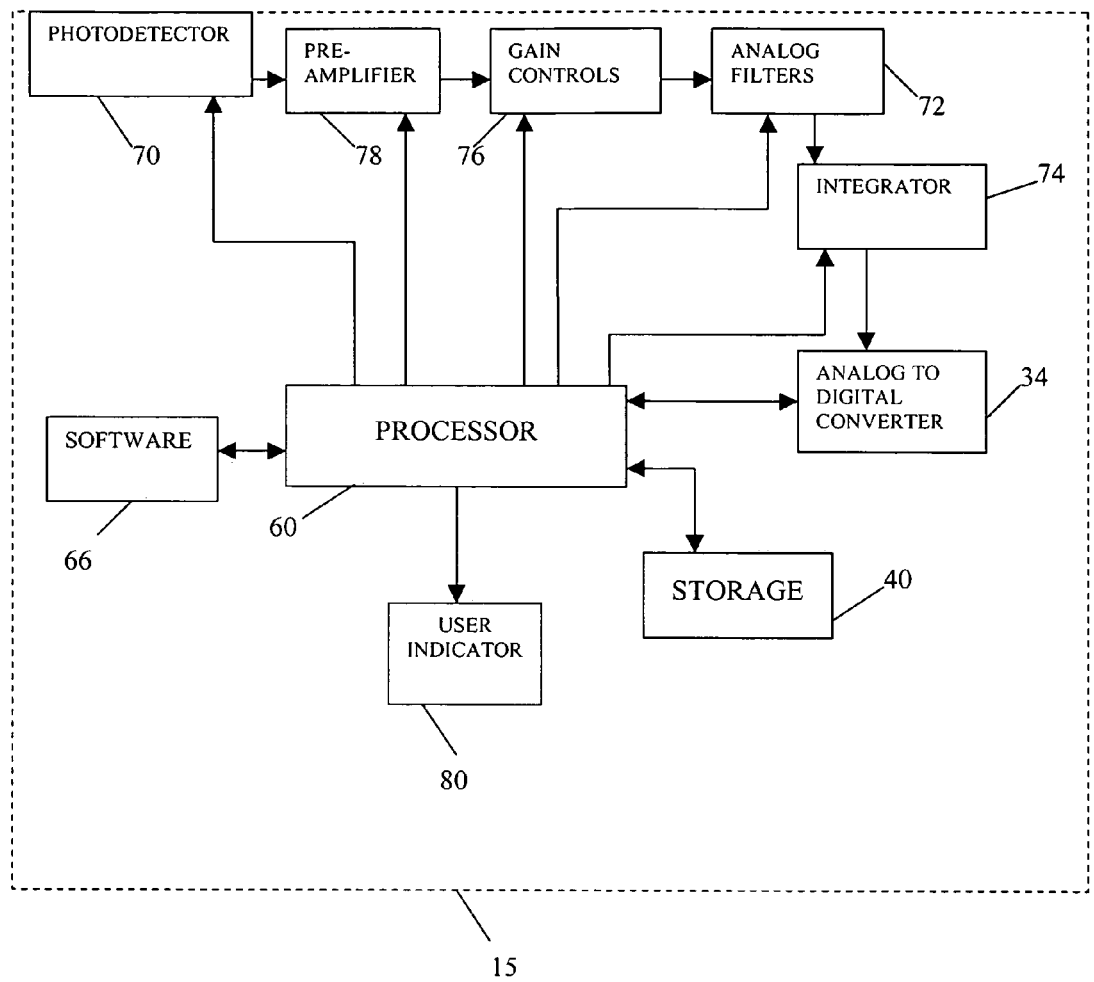
FIG. 5 is a block diagram of a combo user device of the present invention.

The combination of decoder 13 with signaled device 24 is shown as combo user device 15 in FIG. 5, and is the preferred device for detection of carrier signal 20. Combo user device 15 includes many of the components of signaled device 24 and also includes decoding processor 60 and storage 40 which function as previously disclosed above. Combo user device 15 further comprises photodetector 70, which is electronically coupled to decoder processor 60 and capable of optically receiving video signal 18 directly from digital display device 26.

Electronically coupled to decoder processor 60 are pre-amplifier 78 and gain controls 76, which together amplify video signal 18 by changing the resistance on a feedback circuit. Decoder processor 60 controls the amount of gain provided to the circuit. Pre-amplifier 78 and gain controls 76 are used with combo user device 15 as the distance and intensities received from digital display device 26 may vary. Accordingly, when the strength of video signal 18 is low, it is desirable to add gain so that a better reading of video signal 18 is possible. Hence, the present invention measures the signal strength and decides whether to lower or increase the gain.

Analog filters 72 are electronically coupled to decoder processor 60 and provide a low pass filter that removes the high frequency noise from video signal 18 by eliminating all frequencies above a preset level and cleans the signal below a frequency by discarding the undesired signal. Preferably, analog filters 72 are set for 15 Hertz center frequency so as to filter the video energy captured by means of the photodetector 70 (i.e., so that it will detect the A/C nature of the 15 Hertz signal).

Integrator 74 is electronically coupled to decoder processor 60 and detects and measures video signal 18 for one complete frame. Thereafter, analog to digital converter 34 measures the signal strength result of the frame to determine whether carrier signal 20 was present in the particular frame of video signal 18. Optional user indicator 80 provides a means to provide user of combo user device 15 with notice of availability of promotional opportunities based on the receipt of one or more signal absences or signal presences.

Other components may also optionally be added to combo user device 15. Computer interface port (not shown) may be included with the present invention to redeem promotional opportunities such as by the use of a computer with Internet access. It should be further appreciated that photodetector 70, preamplifier 78, gain controls 80, analog filters 82, integrator 74, and analog to digital converter 76 may be implemented on a SD card (as described in Barsoum) that is inserted in a version of a hand-held device that also includes the provision of a SD card slot (not shown). Combo user device 15 may also selectively include the features of the hand-held devices disclosed in Koplar I, Koplar II, Withers or Barsoum.

Figure 6:
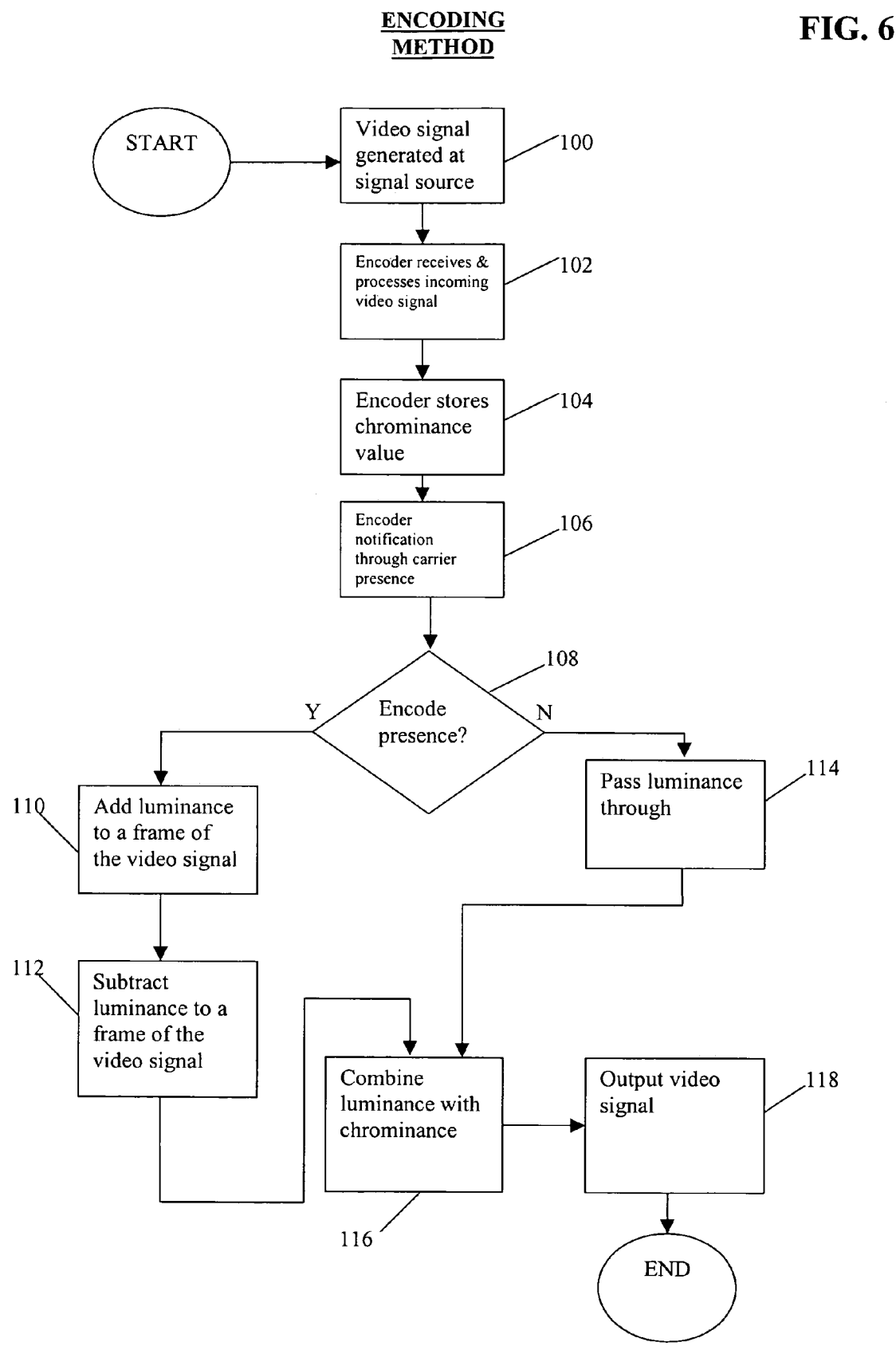
FIG. 6 is a second flow chart of the encoding method of the present invention.

Referring to FIG. 6, the preferred method of modulating carrier signal 20 within video signal 18 by an encoder 12 comprises a first step 100 where video signal 18 is generated in real time or pre-recorded at signal source 10. Thereafter, at step 102, video signal 18 is provided to encoder 12 from signal source 10 by either digital video input 30 or analog video input 32, depending on whether video signal 18 is in digital or analog form. If video signal 18 is analog, analog to digital converter 34 digitizes video signal 18 by creating a digitized video signal 18 by splitting it into its component luminance (i.e., intensity) and chrominance values. Digital signals are already broken into their component luminance and chrominance values and therefore no further processing of video signal 18 is needed. Accordingly, if video signal 18 is digital, then it is already a digitized video signal 18 and no processing is necessary prior to providing video signal 18 to encoder microcontroller 36.

Encoder 12 at step 104 stores the chrominance value of the digitized video signal 18 in storage 40. In the preferred embodiment, the chrominance value of video signal 18 is unaltered during the encoding process. Encoder 12 also stores the luminance value of the digitized video signal 18 in encoder memory 52.

Operator 16 at step 106 directs encoder 12 through various indications received by encoder 12 through carrier presence 38 on the inclusion of signal presences and signal absences in selected pairs of frames of video signal 18. When operator 16 seeks to provide a text message to the user of decoder 13 or combo user device 15 by use of carrier signal 20, operator 16 preferably enters a message into a computer source that converts the textual information into the proper string of signal presences (i.e., ones) and signal absences (i.e., zeros) in either real time or at a time set by use of the SMPTE time code 38. The message is then passed from operator 16 to encoder 12 by carrier presence 38.

Upon receipt of the indications from operator 16, encoder 12 at decision point 108 first determines the timing of where the fields of the frames of video signal 18 start by use of the vertical synchronization signal ("vertical sync"). Encoder 12 determines the timing of the vertical sync by obtaining the information during the inputting process. Preferably, a digital line obtains the vertical sync information from the analog to digital converter 34 while performing the digitization. Not only does analog to digital converter 34 split video signal 18 into its digital components, but it also sends a data line of high when it receives a vertical sync. Accordingly, by obtaining the aforementioned information, encoder 12 determines the start of the fields so as to determine the proper place to begin encoding.

Encoder 12 thereafter at decision point 108 determines whether to encode a signal absence or signal presence based on the indication received through carrier presence 38. In a first and preferred embodiment as shown in FIG. 6, if encoder 12 does not receive any instructions via carrier presence 38 to modify video signal 14, encoder 12 at step 114 continuously encodes signal absences, such that the luminance value of two consecutive frames of video signal 18 is not modified and there is no detectable carrier signal 20 within video signal 18 during these frames.

However, when at decision point 108 encoder 12 seeks to encode a signal presence, during steps 110 and 112 encoder 12 modifies the luminance of two frames of video signal 18 so as to modulate video signal 18. The present invention varies the luminance of the entire frame of video signal 18 rather than varying it line by line as is Broughton. At step 110, the luminance of the first frame of video signal 18 is increased by a slight amount, such as 50-70 mV. Thereafter, at step 112 the luminance of the second frame of video signal 18 is decreased by a slight amount. The encoder 12 thus by raising and lowering the luminance of two consecutive frames creates a frequency of 15 Hertz.

The encoding of a signal presence results in modulated video signal 22 with an alternating characteristic not detectable by the human retina but detectable by an optical detector, photo diode, or photodetector (collectively referred to hereinafter as a "photodetector 70") or by electrical detection means. Therefore, by modulating video signal 18 with a series of signal presences and signal absences over a period of time, a data string may be encoded and detected by detector 13 and transmitted to signaled device 24 or transmitted from a digital display device 26 and optically detected directly by combo user device 15.

The encoding of the present invention during steps 110, 112 and 114 is on a frame by frame basis, as the present method encodes for a complete frame (i.e., two fields). Since the two fields are not necessarily interlaced (i.e., they could be a progressive scan), the entire frame may be displayed all at one time. Accordingly, encoding over two fields necessitates use of a complete frame. Thus, the present invention synchronizes encoding to the first field of the frame and not the second field since the circuitry does not determine the method of display of the second field. However, the present encoding methods relies on encoding frames in sets of two so as to compare the relative luminous value of the frames to determine whether there has been intensity added to or subtracted from the frames. Since adjacent frames typically have nearly the same intensity, modifications to the intensity are detectable by a decoder 13 or combo user device 15.

During steps 110 and 112, encoder 12 adds or subtracts from the level of luminance of particular pixels in video signal 18. In general, luminance varies from zero to maximum scale value of 100, with a bright screen at 100 and a dark screen at zero. Encoder 12 modulates the luminance around whatever value is obtained. By use of the steps 110 and 112, varied with the step 114, the method effectively creates an AC signal that rides on top of the DC energy being produced by video signal 18.

Once video signal 18 is encoded with a signal absence or signal presence pursuant to step 110 and 112 or 114, it is outputted from encoder 12 as modulated video signal 22 by digital video output 44. If modulated video signal 22 is to be outputted as an analog signal, signal 22 is converted to analog by digital to analog converter 32 and outputted by analog video output 48.

Figure 7:
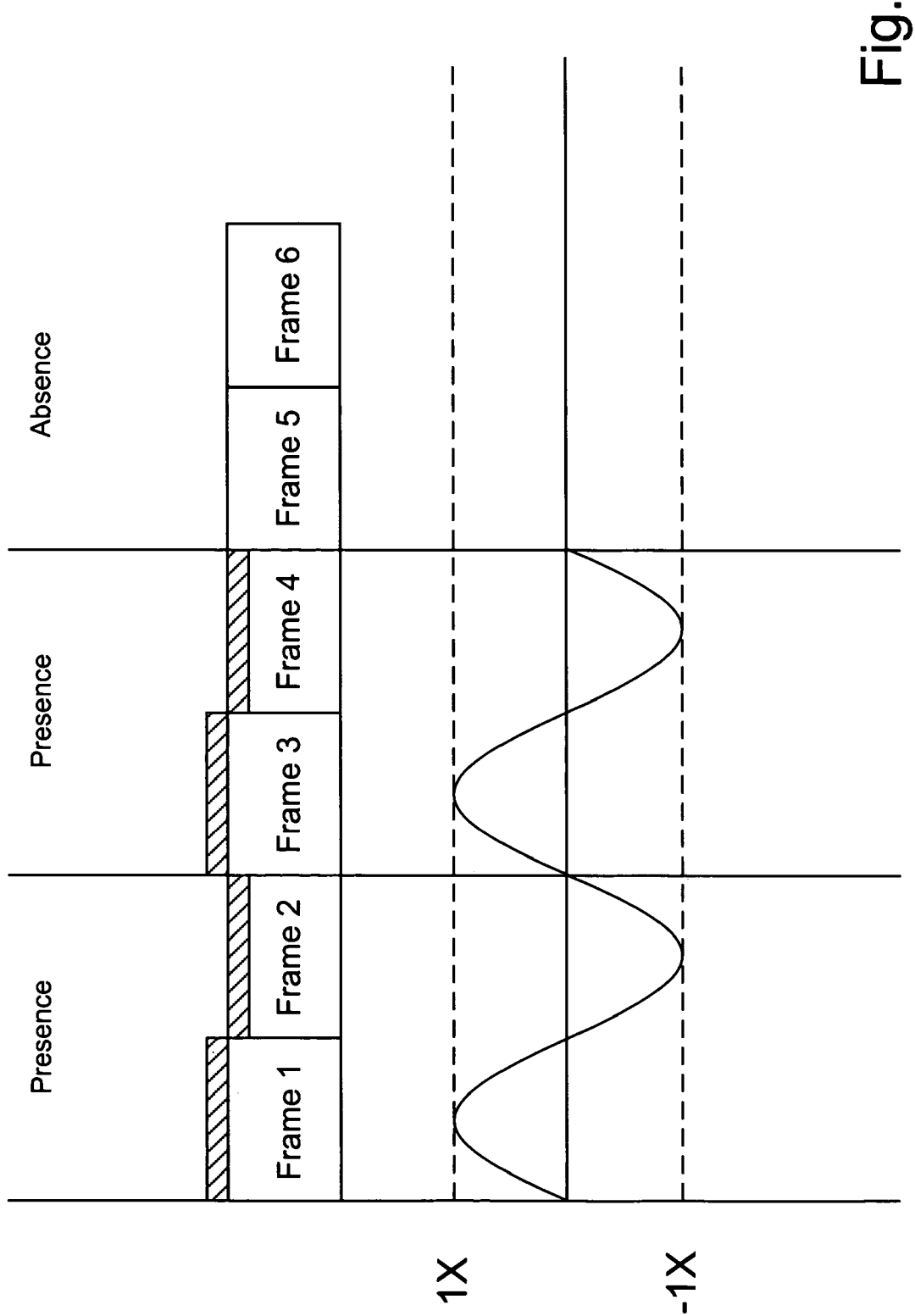
FIG. 7 is a frame timing and value diagram of one embodiment of the present invention.

As shown in FIG. 7, a demonstration of the foregoing method of encoding of carrier signal 20 in video signal 18 includes a sine-wave demonstrating a 15 Hertz signal during the first four frames and no 15 Hertz signal presenting during the last two frames representing signal presence, signal presence and signal absence respectively.

Figure 8:
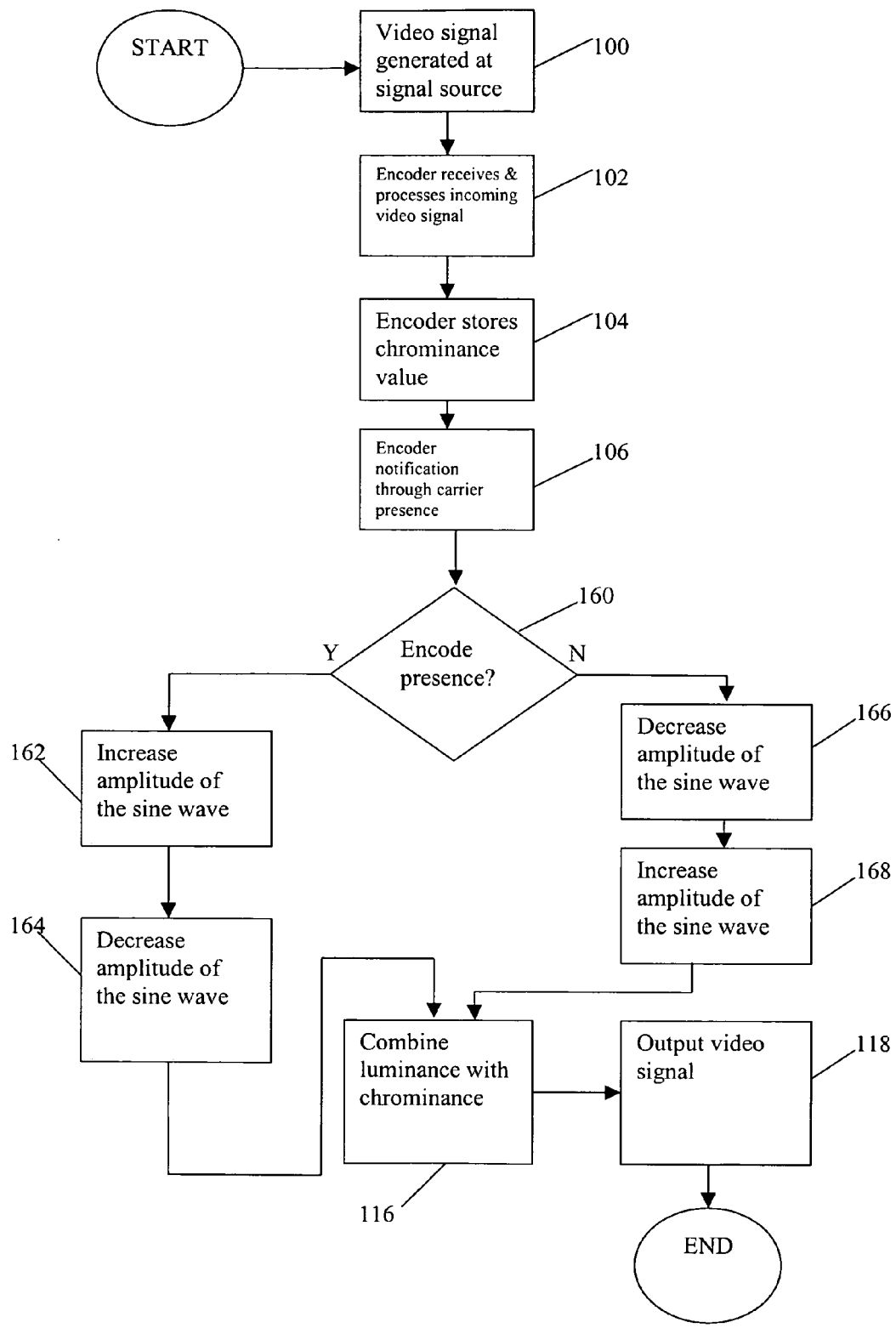
FIG. 8 is a second flow chart of the encoding method of the present invention.

A second encoding method of the present invention is shown in FIG. 8 to comprise the same steps 100, 102, 104, and 106 of the preferred encoding method described above. After completing the aforementioned steps, encoder 12 at decision point 160 determines the timing of where the fields start by vertical sync as describe above. Thereafter, encoder 12 modulates a constant sine wave in every frame of video signal 18 and determines whether to encode a signal absence or signal presence in video signal 18.

If encoder 12 is to encode a signal presence, then encoder at steps 162, 164 first increases and then decreases the amplitude of the sine wave in respective frames. In contrast, if encoder 12 is to encode a signal absence, then encoder at steps 166, 168 first decreases and then increases the amplitude of the sine wave in respective frames. Accordingly, the complimentary encoding of "decrease increase" represents a signal absence, and the complementary encoding of "increase decrease" represents a signal presence. It should also be appreciated that the reverse of the "increase decrease" patterns could also be used as desired.

Figure 9:
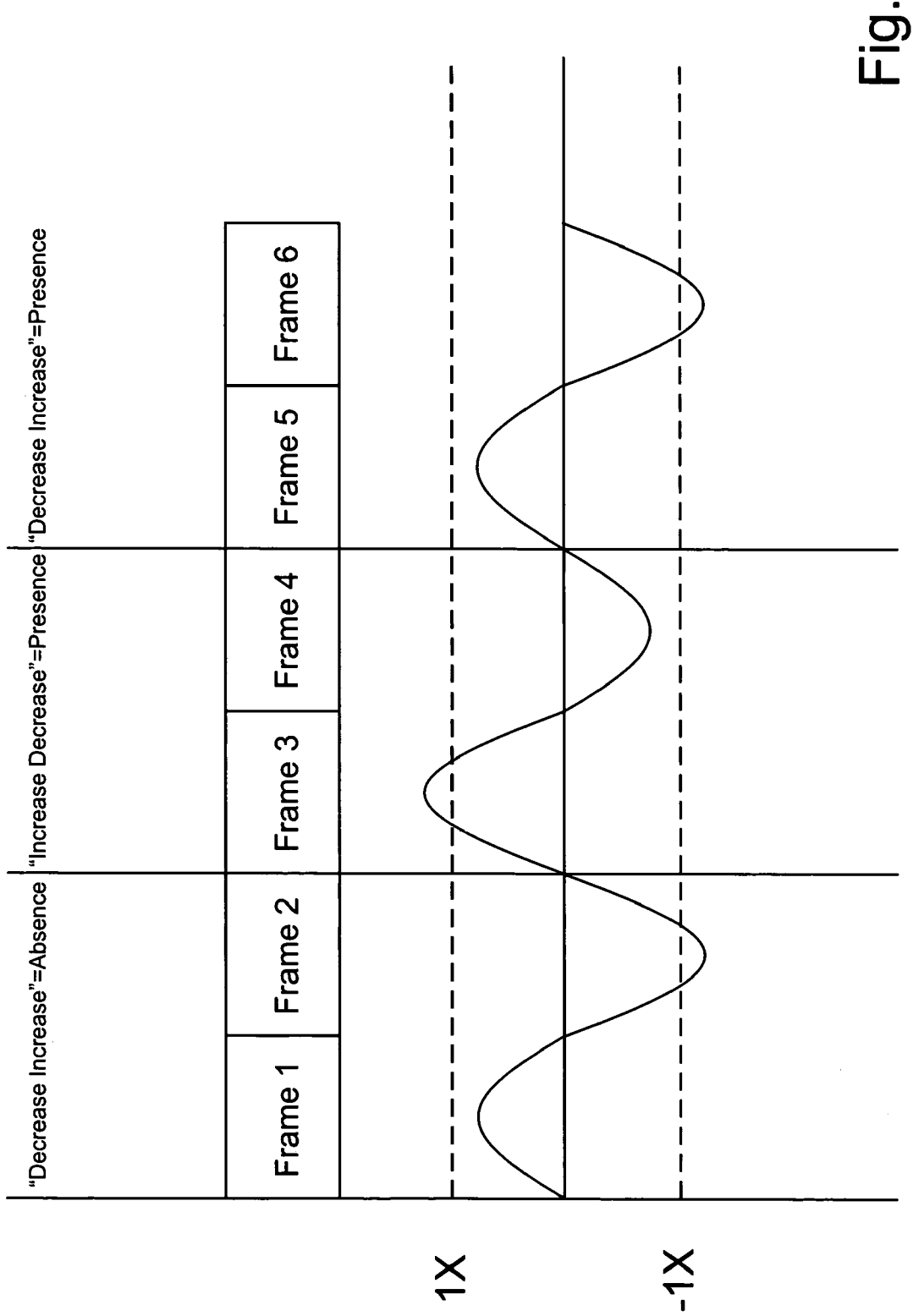
FIG. 9 is a frame timing and value diagram of one embodiment of the present invention.

As shown in FIG. 9, a demonstration of the foregoing method of encoding of carrier signal 20 in video signal 18 includes a sine-wave demonstrating encoding of "decrease increase", "increase decrease" and "decrease increase" during six frames of video signal 18 representing signal absence, signal presence, and signal presence respectively.

In yet another embodiment, a third encoding method of the present invention comprises the same steps 100, 102, 104, and 106 of the preferred encoding method described above. After completing the aforementioned steps, encoder 12 at decision point determines the timing of where the fields start by vertical sync as describe above.

Encoder 12 modulates a constant 15 Hertz signal sine wave in every frame of video signal 18 and determines whether to encode a signal absence or signal presence in video signal 18. Encoder 12 adds one or more amplitude levels to the amplitude of video signal 18 on a frame by frame basis, for which the resulting reception of such video signal 18 will generate a code relative to one or more data bits. Preferably, two amplitude levels are available for each frame so that each frame may then encode a single bit. Accordingly, by use of this embodiment, two consecutive frames may be used to encode two complimentary bits.

Figure 10:
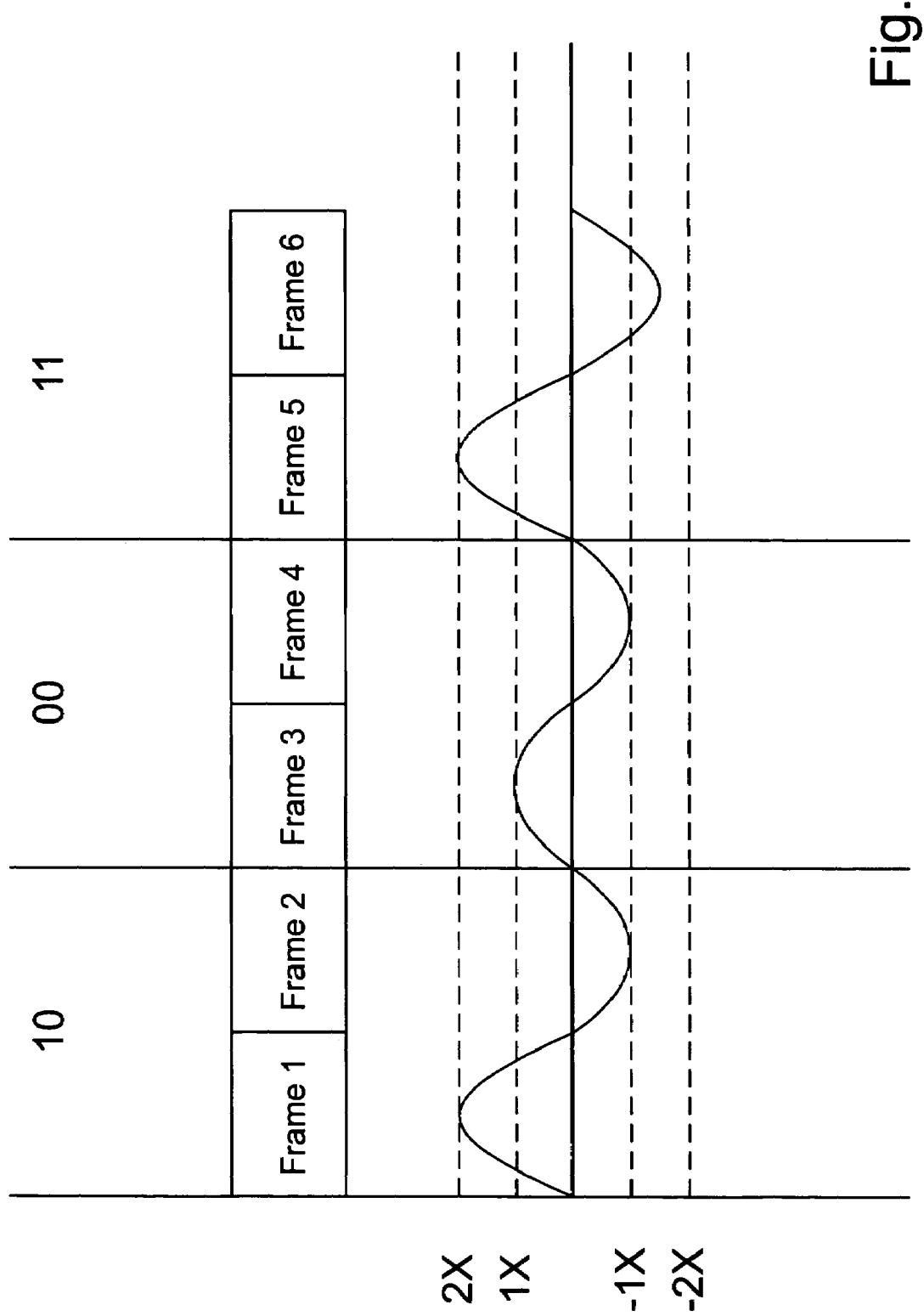
FIG. 10 is a frame timing and value diagram of one embodiment of the present invention.

FIG. 10 provides an example of the aforementioned method of encoding of two consecutive frames of 2x and −1x, 1x and −1x, and 2x and −2x, which respectively correspond to bit codes of "10", "00" and "11".

The present encoding methods preferably do not modify the audio signal that is part of video signal 18, as the audio signal passes directly through encoder 12 unaltered. The delay between the audio and video is minimal (i.e., only one or two lines) which may result in a 50 microseconds delay per line. Since this delay is generally not perceivable for a person viewing the video program on digital display device 26, it is preferably not necessary to delay the audio at encoder 12. However, if necessary or desirable, encoder 12 may also include audio delay circuitry to ensure that the audio and video are in perfect synchronization.

Once the modifications to video signal 18 are complete, encoder 12 outputs the resulting modulated video signal 22 via digital video output 44 or analog video output 48 though digital to analog converter 46. Modulated video signal 22 is then provided to broadcast source 14 so that it may be presented on digital display device 26.

As an alternative to the foregoing encoding methods, encoder 12 may make the luminance changes within a line instead of by frame. Thus, instead of encoder 12 outputting an entire line of luminance to broadcast source 14, the changes are made to video signal 18 as it enters encoder 12 instead of by storing it.

Figure 11:
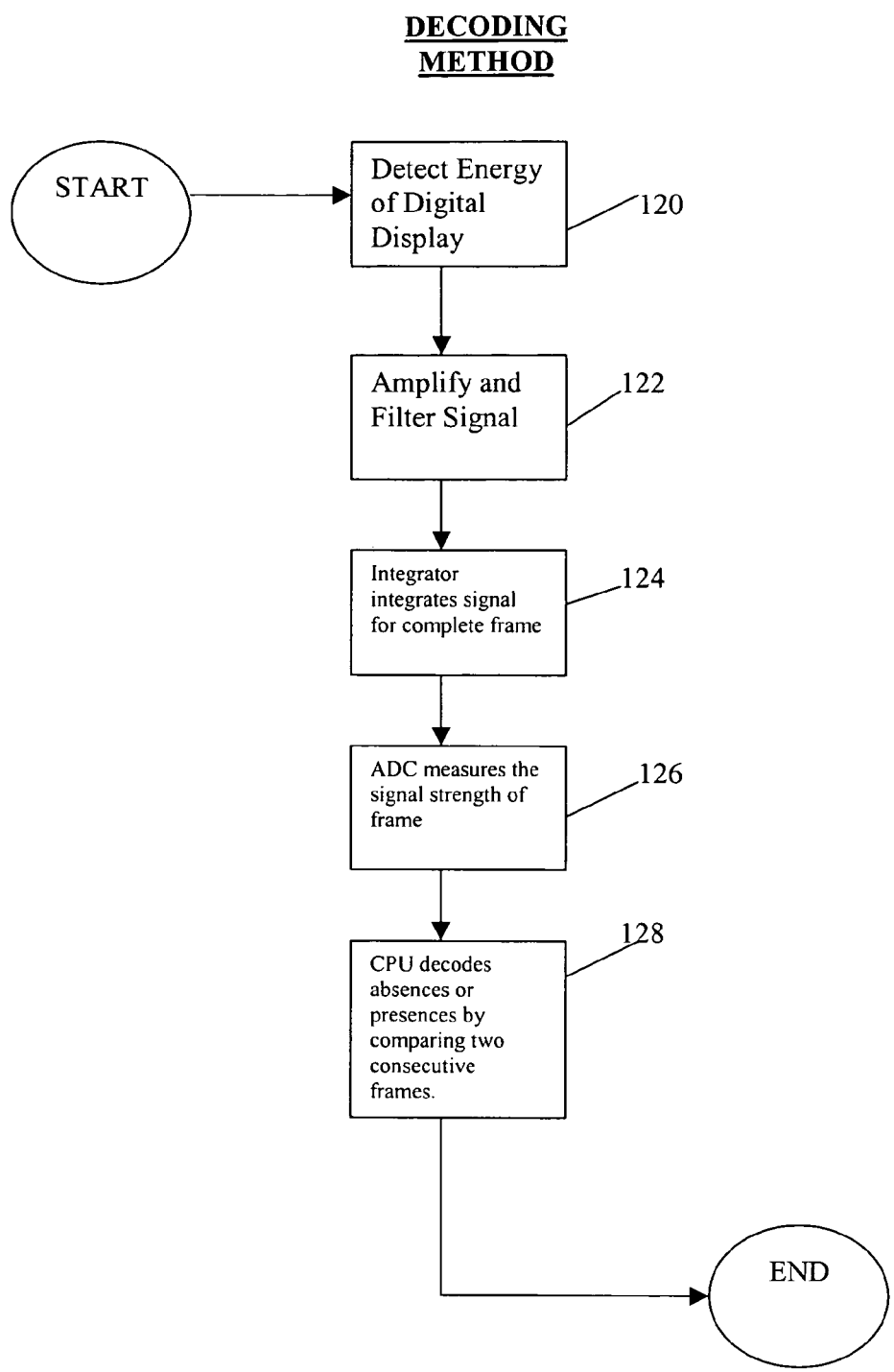
FIG. 11 is a second flow chart of the decoding method of the present invention.

Referring to FIG. 11, at step 120 combo user device 15 optically detects modulated video signal 22 from digital display device 26 by a photodetector 70. When using decoder 13, broadcast source 14 at step 120 provides modulated video signal 22 to decoder 13 for detection. Decoder 13 provides unaltered modulated video signal 22 to digital display device 26 for presentation to a viewer of the video program presented on digital display device 26 and also uses modulates signal 22 on decoder 13 as described for combo user device 15 in greater detail below.

Combo user device 15 (or decoder 13) at step 122 amplifies and filters modulated video signal 22. Thereafter, at step 124 combo user device 15 integrates modulated video signal 22 for one complete frame. Once the signal is integrated, at step 126 analog to digital converter 34 measures the signal strength of modulated video signal 22. Thereafter, decoder processor 60 at step 128 decodes signal absences or signal presences by comparing two consecutive frames of modulated video signal 22 to determine relative signal strength. If the frames have nearly the same level of signal strength or otherwise meet the criteria for a signal absence, then combo user device 15 reports a signal absence for the two frame set. If the frames have a differing level of signal strength beyond a minimal threshold or otherwise meet the criteria for a signal presence, then combo user device 15 reports a signal presence for the two frame set.

Figure 12:
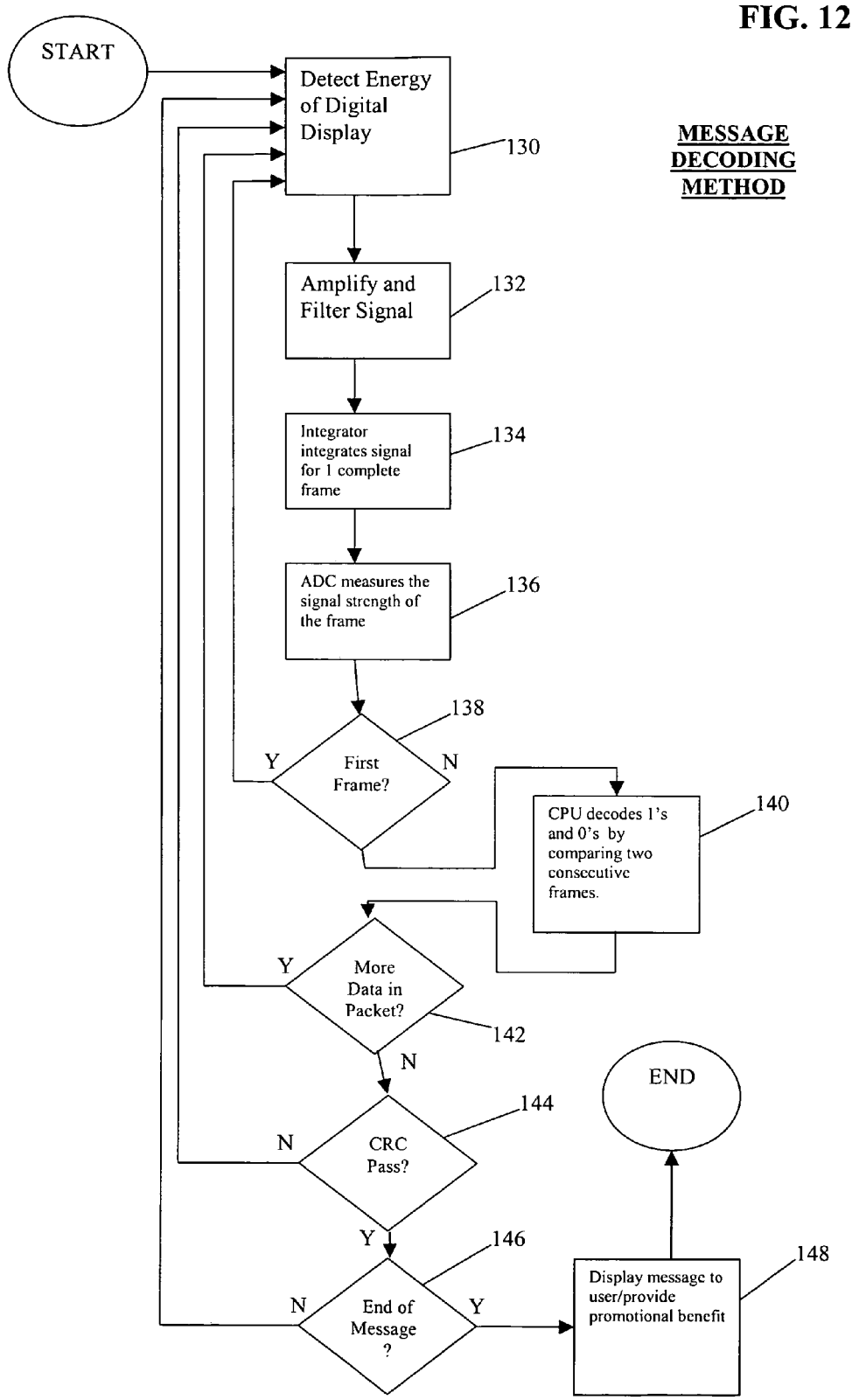
FIG. 12 is a third flow chart of the decoding method of the present invention.

Referring to FIG. 12, at step 130 the modulated video signal 22 that was encoded by one of the foregoing encoding methods and presented on digital display device 26 is presented and detected by combo user device 15 (or decoder 13). Thereafter, at step 132, modulated video signal 14m is amplified and filtered by pre-amplifier 78, gain controls 80 and analog filters 82.

Combo user device 15 at step 132 amplifies and filters modulated video signal 22. Thereafter, at step 134 combo user device 15 integrates modulated video signal 22 for one complete frame. Once the signal is integrated, at step 136 analog to digital converter 34 measures the signal strength of modulated video signal 22.

Thereafter, decoder processor 60 at decision point 138 determines whether combo user device 15 was looking at the first or second of two frames. If decoder processor 60 was looking at the first frame, decoder processor 60 returns to step 130 to detect the second frame of video signal 18. If not, decoder processor at step 140 decodes a data bit of 0 (i.e., a signal absence) or 1 (i.e., a signal presence) in modulated video signal 22, or in the case of the third encoding method two data bits.

At step 142, decoder processor 60 determines whether there are more bits of data remaining in the transmitted packet of data. If yes, decoder process 60 returns to step 130 to detect additional data bits. If no, decoder processor 60 at step 144 determines whether the data packet passes a CRC test. If no, decoder processor 60 discards the data packet and returns to step 130.

If yes, decoder processor 60 proceeds to decision point 146 where it determines whether the data packet it received is the end of the message (i.e., the last of a series of packets). If no, decoder processor 60 returns to step 130 to receive additional data packets to complete the message. If yes, decoder processor at step 148 proceeds to provide the message and/or promotional opportunities to the user of combo user device 15.

EXAMPLE

Figure 13:
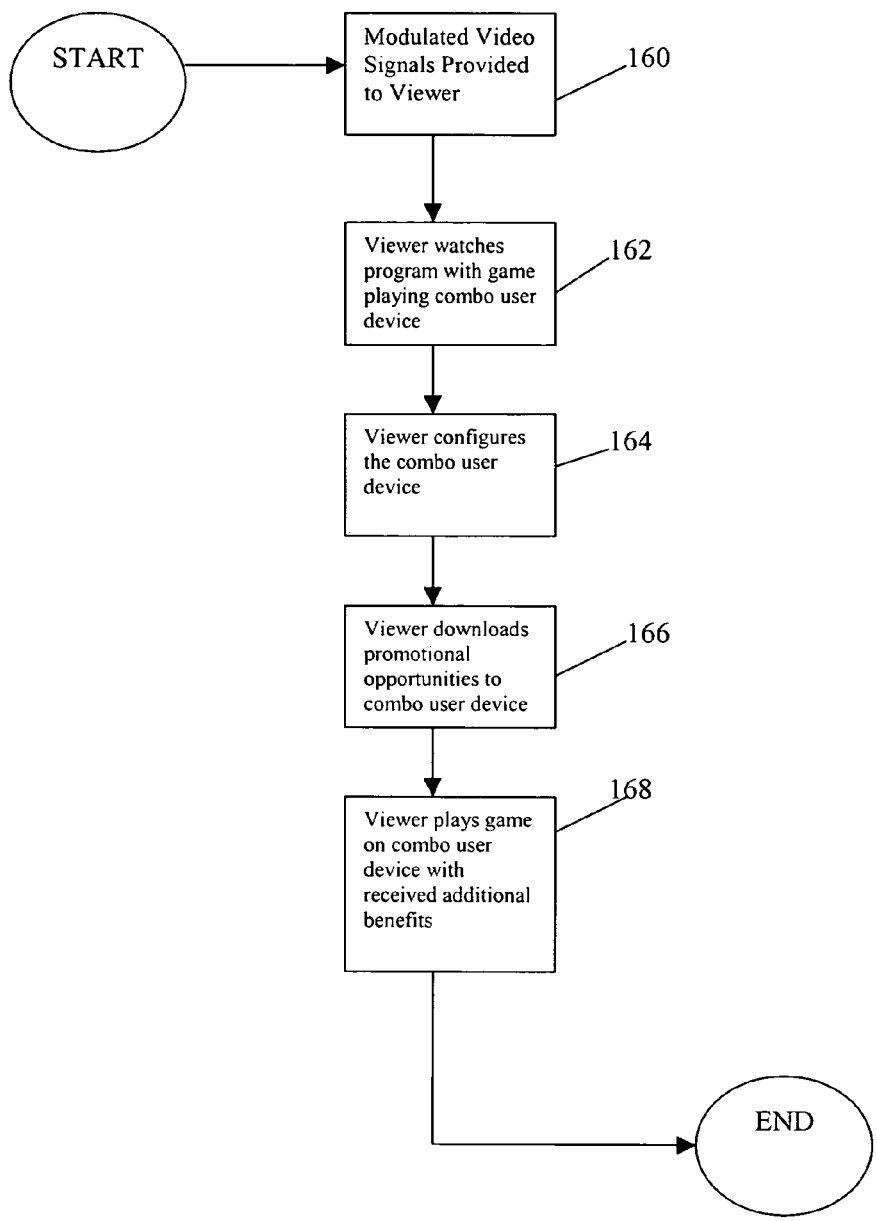
FIG. 13 is a flow chart of the game playing method of the present invention.

A practical embodiment of the foregoing may be observed in FIG. 13 to comprise a first step 160 at which digital display device 26 such as a plasma television presents a video program such as cartoon to a user of combo user device 15. Video signals 18 of the cartoon are modulated with carrier signals 20 in accordance with one of the embodiments of the present invention and are transmitted from broadcast source 14 to the plasma television.

At step 162 viewer watches the cartoon with combo user device 15. Next, at step 164 the user orients combo user device 1515, in the form of a game device 15 such as a "Nintendo Gameboy", towards the plasma television. The user configures and then preferably begins playing a video game on game device 15. Game device 15 is outfitted with an optical detector, circuitry and appropriate software to optically receive video signals 18 from digital display device 26.

During the course of the video game on game device 15, the cartoon transmits modulated video signals 22 to game device 15. Viewer at step 166 receives modulated video signals 22 on game device 15. Game device 15 thereafter detects carrier signal 20 so that game device 15 can receive enhanced play, such as additional lives, bonus levels, new weapons, new monsters, etc. by detection of carrier signals 20 on the handheld device. Viewer at step 168 can take advantage of the enhanced play from the detection of carrier signals 20.

It should also be appreciated that the present system also permits coexistence with other modulation and encoding schemes such as described in Broughton. Accordingly, by the use of Broughton and the present invention, both analog and digital display devices may broadcast auxiliary data that can be received by hand held devices outfitted to receive these video signals.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

What is claimed is:

1. A method comprising:
    accessing a plurality of data bits, wherein some of the plurality of data bits are of a first data bit type and a remaining number of the plurality of data bits are of a second data bit type;
    designating a plurality of signal presences in a video signal, a particular signal presence of the plurality of signal presences being designated to raise luminance of a first consecutive frame and lower luminance of a second consecutive frame of a plurality of frames of the video signal in a substantially invisible way;
    designating a plurality of signal absences in the video signal, a particular signal absence of the plurality of signal absences is designated by passing through two consecutive unaltered frames of the video signal; and
    modulating the video signal based on the designating of the plurality of signal presences and the signal absences to produce a modulated video signal, the modulated video signal including the video signal modulated with the plurality of data bits,
    wherein raising of the luminance of the first consecutive frame increases total luminance of the first consecutive frame and lowering of the luminance of the second consecutive frame decreases the total luminance of the second consecutive frame.

2. The method of claim 1, wherein the accessing of the plurality of data bits comprises:
    accessing a data string; and
    converting the data string into the plurality of data bits.

3. The method of claim 1, wherein the particular signal presence of the plurality of signal presences being is designated to
    raise luminance of a first plurality of pixels of a first consecutive frame and lower luminance of a second plurality of pixels of a second consecutive frame in a substantially invisible way.

4. The method of claim 3, wherein the first plurality of pixels includes a same selection of pixels as the second plurality of pixels.

5. The method of claim 3, wherein at least some of the first plurality of pixels are located in the first consecutive frame at a same location of at least some of the second plurality of pixels in the second consecutive frame.

6. The method of claim 3, wherein the first plurality of pixels includes an entire portion of pixels of the first consecutive frame and the second plurality of pixels includes the entire portion of pixels of the second consecutive frame.

7. The method of claim 1, wherein the second consecutive frame is located prior to the first consecutive frame in the video signal.

8. The method of claim 1, wherein the second consecutive frame is located after the first consecutive frame in the video signal.

9. The method of claim 1, wherein the video signal includes a digital video signal.

10. A system comprising:
    an encoder to
        access a plurality of data bits, wherein some of the plurality of data bits are of a first data bit type and a remaining number of the plurality of data bits are of a second data bit type,
        designate a plurality of signal presences in a video signal, a particular signal presence of the plurality of signal presences being designated to raise luminance of a first consecutive frame and lower luminance of a second consecutive frame of a plurality of frames of the video signal in a substantially invisible way;
        designate a plurality of signal absences in the video signal, a particular signal absence of the plurality of signal absences is designated by passing through two consecutive unaltered frames of the video signal; and
        modulate the video signal based on the designating of the plurality of signal presences and the signal absences to produce a modulated video signal, the modulated video signal including the video signal modulated with the plurality of data bits,
    wherein raising of the luminance of the first consecutive frame increases total luminance of the first consecutive frame and lowering of the luminance of the second consecutive frame decreases the total luminance of the second consecutive frame.

11. The system of claim 10, further comprising:
    a signal source to provide the video signal to the encoder; and
    a broadcast source to receive the modulated video signal from the encoder and transmit the modulated video signal.

* * * * *